(12) United States Patent
Oguri

(10) Patent No.: US 8,570,644 B2
(45) Date of Patent: Oct. 29, 2013

(54) OPTICAL MODULATOR

(75) Inventor: Hitoshi Oguri, Funabashi (JP)

(73) Assignee: Sumitomo Osaka Cement Co., Ltd., Chiyoda-ku, Tokyo (JP)

(*) Notice: Subject to any disclaimer, the term of this patent is extended or adjusted under 35 U.S.C. 154(b) by 72 days.

(21) Appl. No.: 13/141,240

(22) PCT Filed: Dec. 25, 2009

(86) PCT No.: PCT/JP2009/007317
§ 371 (c)(1),
(2), (4) Date: Jun. 21, 2011

(87) PCT Pub. No.: WO2010/073730
PCT Pub. Date: Jul. 1, 2010

(65) Prior Publication Data
US 2011/0255147 A1    Oct. 20, 2011

(30) Foreign Application Priority Data

Dec. 26, 2008   (JP) .................................. 2008-335097

(51) Int. Cl.
| G02B 26/08 | (2006.01) |
| G02B 26/00 | (2006.01) |
| G02F 1/01  | (2006.01) |
| G02B 6/10  | (2006.01) |

(52) U.S. Cl.
USPC ............... 359/303; 359/237; 359/301; 385/1; 385/129

(58) Field of Classification Search
USPC ......... 359/303, 238, 315, 215, 247, 251–252, 359/108, 237, 278–279, 290–292, 359/300–302; 385/40, 129–132, 5, 8–9, 385/1–3; 398/102, 152, 65, 183–184, 147, 398/182, 161
See application file for complete search history.

(56) References Cited

U.S. PATENT DOCUMENTS 6,607,313 B1 *  8/2003  Farries et al. ................. 398/102

FOREIGN PATENT DOCUMENTS

| JP | 8-86936     | 4/1996 |
| JP | 11-88299    | 3/1999 |
| JP | 2001-36505  | 2/2001 |
| JP | 2004-253931 | 9/2004 |

* cited by examiner

*Primary Examiner* — Dawayne A Pinkney
(74) *Attorney, Agent, or Firm* — Merchant & Gould P.C.

(57) ABSTRACT

The present invention realizes an enhancement of a fabrication yield and a reduction of a size regarding an optical modulator or an optical device including polarization beam combining means. An optical modulator of the present invention (1) includes: first and second optical modulators (LN optical modulators (101) to (104)) that are formed on a substrate; a polarization beam rotating unit (107) that rotates at least one polarization beam of modulated light beams modulated by the first and second optical modulators; and a polarization beam combining element (110) that is disposed outside the substrate and that combines the polarization beams of the modulated light of which the polarization beams are rotated by the polarization beam rotating unit (107).

13 Claims, 6 Drawing Sheets

OPTICAL MODULATOR

This application is a National Stage Application of PCT/JP2009/007317, filed 25 Dec. 2009, which claims benefit of Serial No. 2008-335097, filed 26 Dec. 2008 in Japan and which applications are incorporated herein by reference. To the extent appropriate, a claim of priority is made to each of the above disclosed applications.

TECHNICAL FIELD

The present invention relates to an optical modulator including polarization beam combining means.

BACKGROUND ART

With the recent development of high-speed and large-capacity optical fiber communication systems, high-speed optical modulators using a waveguide type optical element such as an external modulator have been widely used.

Since a waveguide type optical device of which a substrate is formed of a material such as $LiNbO_3$ (lithium niobate which is also abbreviated as LN) having an electro-optical effect can cause a variation in refractive index with a voltage variation, the waveguide type optical device is used as an optical modulator (generally referred to as LN optical modulator) or an optical switch.

Regarding the increase in speed of the optical fiber communication systems, speeds of 10 Gb/s to 40 Gb/s have been used and the development toward 100 Gb/s is being carried out. To realize 100 Gb/s using an LN optical modulator, as shown in FIG. 5, a method of modulating light beams by 25 Gb/s using four optical modulators 901 to 904, combining the outputs of the optical modulator 901 and the optical modulator 902, and the outputs of the optical modulator 903 and the optical modulator 904, respectively, to acquire modulated light beams of 50 Gb/s, and combining two modulated light beams of 50 Gb/s in a state where the relative angle difference between polarization planes is set to 90° by the use of polarization beam rotating means 905 to acquire a modulated light beam of 100 Gb/s into which the polarization beams of the modulated light of 50 Gb/s are combined has been suggested (for example, see PTL 1). This method has a merit that a modulation circuit corresponding to 25 Gb/s can be used and thus is considered as a promising method.

CITATION LIST

Patent Literature

[PTL 1] JP-A-2004-253931

SUMMARY OF INVENTION

Technical Problem

In the LN optical modulator shown in FIG. 5, for example, since waveguides are formed in an asymmetric X-shaped structure so as to combine light beams with different polarizations by the use of the polarization beam combining unit 906, it is necessary to match the propagating speeds of the polarization beams and core diameters. However, since the asymmetric X-shaped waveguide is complex in design and high-precision fabrication techniques are necessary for the fabrication, there is a problem in that the yield in mass production is lowered.

The present invention is made in consideration of the above-mentioned circumstances, and a goal thereof is to enhance the fabrication yield of an optical modulator or an optical device including polarization beam combining means.

Solution to Problem

According to an aspect of the present invention for accomplishing the above-mentioned goal, there is provided an optical modulator including: first and second optical modulation units that are formed on a substrate; a polarization beam rotating unit that rotates at least one polarization beam of modulated light beams modulated by the first and second optical modulation units; and a polarization beam combining unit that is disposed outside the substrate and that includes a polarization beam combining element combining the polarization beams of the modulated light of which the polarization beams are rotated by the polarization beam rotating unit.

In the optical modulator, it is preferable that the polarization beam combining unit includes a condensing unit that condenses the modulated light beams on an output waveguide.

In the optical modulator, it is preferable that the polarization beam combining unit includes an optical element having an inverse dispersion characteristic.

In the optical modulator, it is preferable that the polarization beam combining unit includes an optical system in which two opposed collimating systems are arranged. The opposed collimating systems may employ a V-grooved block.

In the optical modulator, it is preferable that the two opposed collimating systems include fiber collimators, respectively. In general, the fiber collimator has a configuration in which an optical fiber and a collimator lens are formed in a single body, but a lensed fiber having the same lens diameter as a fiber diameter can be preferably used.

In the optical modulator, it is preferable that the fiber collimators include a two-hole ferrule used in a portion to which the modulated light beams modulated by the first and second optical modulation units are input and a one-hole ferrule used in a portion to which an output light beam of the polarization beam combining element is input. A lensed fiber may be built in the ferrule to constitute a fiber collimator. According to this configuration, it is possible to reduce the size of the optical modulator.

In the optical modulator, it is preferable that the fiber collimator including the one-hole ferrule is disposed such that an input position thereof is substantially located at the center of a position gap varying depending on the polarization beams of the output light of the polarization beam combining element. According to this configuration, when a wavelength varies, the output difference between the polarization beams caused due to the position gap in the input position between the different polarization beams is small, thereby compensating for a chromatic dispersion.

In the optical modulator, it is preferable that the polarization beam combining element is a Savart plate. According to this configuration, it is possible to reduce the size of the optical modulator.

In the optical modulator, it is preferable that the Savart plate is configured to compensate for an optical path difference between two polarization beams to be combined. The optical modulator may be configured to compensate for an optical path difference caused between two polarization beams using a polarization beam combining element other than the Savart plate.

Advantageous Effects of Invention

According to the present invention, it is possible to effectively enhance the fabrication yield of an optical modulator including polarization beam combining means.

DESCRIPTION OF EMBODIMENTS

Hereinafter, embodiments of the present invention will be described in detail with reference to the accompanying drawings.

First Embodiment

Figure 1:
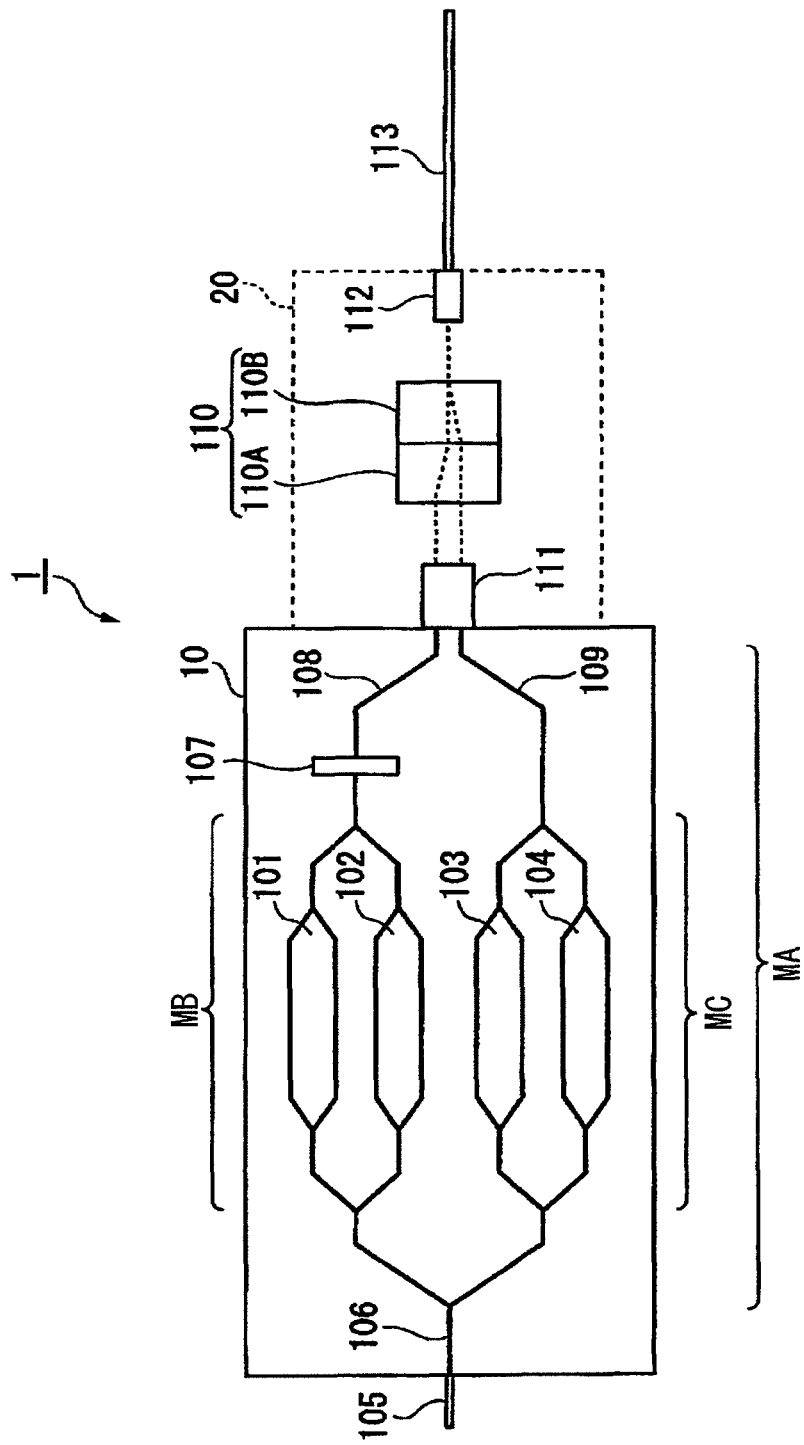
FIG. 1 is a top view illustrating the configuration of an optical modulator according to a first embodiment of the present invention.

FIG. 1 is a top view illustrating the configuration of an optical modulator 1 according to a first embodiment of the present invention. The optical modulator 1 includes a modulator body 10 in which waveguides and modulation electrodes are formed on an LN substrate and a polarization beam combining unit 20 formed of a spatial collimating optical system that combines polarization beams of output light from the modulator body 10. The modulation electrodes are not shown in the drawing.

The modulator body 10 has an embedded structure in which Mach-Zehnder waveguides MB and MC are disposed in both arms of a Mach-Zehnder waveguide MA, Mach-Zehnder waveguides 101 and 102 are disposed in both arms of the Mach-Zehnder waveguide MB, and Mach-Zehnder waveguides 103 and 104 are disposed in both arms of the Mach-Zehnder waveguide MC. That is, an input light beam input to an input waveguide 106 of the Mach-Zehnder waveguide MA from an input fiber 105 is branched and input to the Mach-Zehnder waveguides MB and MC in both arms. The input light beam to the Mach-Zehnder waveguide MB is branched and input to the Mach-Zehnder waveguides 101 and 102 and the input light beam to the Mach-Zehnder waveguide MC is branched and input to the Mach-Zehnder waveguides 103 and 104. The output light beams from the Mach-Zehnder waveguides 101 and 102 are combined by the Mach-Zehnder waveguide MB and the combined light beam is input to an arm 108 of the Mach-Zehnder waveguide MA. The output beams from the Mach-Zehnder waveguides 103 and 104 are combined by the Mach-Zehnder waveguide MC and the combined light beam is input to an arm 109 of the Mach-Zehnder waveguide MA.

The Mach-Zehnder waveguides 101 to 104 form LN optical modulators along with the modulation electrodes formed therefor, respectively. The modulation electrodes of the LN optical modulators 101 to 104 are supplied with a driving signal of 25 Gb/s from a driving circuit not shown and the LN optical modulators 101 to 104 output modulated light beams modulated in 25 Gb/s, respectively. Here, the LN optical modulators 101 and 102 of the Mach-Zehnder waveguide MB employ a modulation method of DQPSK (Differential quadrature phase shift keying). The LN optical modulators 103 and 104 of the Mach-Zehnder waveguide MC employ the same modulation method. Accordingly, modulation light beams of 50 Gb/s are input to the arms 108 and 109 of the Mach-Zehnder waveguide MA, respectively.

Polarized wave rotating means 107 is disposed in the arm 108 of the Mach-Zehnder waveguide MA. The polarization beam rotating means 107 has a function of rotating a polarization plane of the light beam propagating in the arm 108 by 90°. Accordingly, the polarization planes of the light beams propagating in the arm 108 and the arm 109 of the Mach-Zehnder waveguide MA are oblique to each other by 90°. The polarization beam rotating means 107 can have, for example, a structure in which a half-wave plate is embedded in a groove formed in the LN substrate. Alternatively, a half-wave plate may be attached to an end face of the waveguides of the LN substrate or the end face of a two-hole ferrule collimator 111. In order to compensate for an optical path difference between two optical paths due to the half-wave plate, it is preferable that a plate having a predetermined optical length is inserted into the optical path.

By rotating the polarization plane of the light beam propagating in the arm 108 by 45° and rotating the polarization plane of the light beam propagating in the arm 109 by 45° in the opposite direction, both polarization planes may be made to be oblique by 90°.

The arms 108 and 109 of the Mach-Zehnder waveguide MA are arranged to have the same interval as the interval between two holes of the two-hole ferrule collimator 111 in the output end face (the right end face in FIG. 1) of the modulator body (LN substrate) 10. This arrangement interval is set to about 125 μm to 150 μm, for example. In order to prevent reflection, the output end face of the LN substrate can be preferably ground to form an angle of about 5° to the light beam output direction or can be preferably subjected to an anti-reflection (AR) coating process.

The polarization beam combining unit 20 is formed as a spatial collimating optical system in which optical elements such as a two-hole ferrule collimator 111, a polarization beam combining element 110, and a one-hole ferrule collimator 112 are sequentially arranged from the modulator body 10.

The two-hole ferrule collimator 111 has a configuration in which a fiber collimator formed of a polarization beam holding fiber is built in each of two holes of the two-hole ferrule. The fiber collimator is formed in a single body by welding a rod-shaped lens having the same diameter as a fiber to the fiber and is also referred to as a lensed fiber. The polarization beam holding fibers are set such that the polarization directions thereof are matched with the polarization directions of the modulated light beams output from two output waveguides 108 and 109 of the modulator body 10, respectively. Both end faces (the right input end face and the left output end face in FIG. 1) of the fiber collimator are preferably subjected to an anti-reflection (AR) coating process. The two-hole ferrule collimator 111 having this configuration is butt-jointed to the output waveguides 108 and 109 at the waveguide end faces of the LN substrate such that the optical axes are matched. Accordingly, the modulated light beams from the output waveguides 108 and 109 of the modulator body 10 are input to the fiber collimators of the two-hole ferrule collimator 111 of the polarization beam combining unit 20 and are output to the polarization beam combining element 110 from the fiber collimators.

The polarization beam combining element 110 has a function of outputting two light beams input to different input positions to the same optical path in a state where the polarization planes thereof are oblique to each other by 90°. Here, the polarization beam combining element 110 outputs the modulated light beams, which have been output from the two-hole ferrule collimator 111 in the state where the polarization planes are oblique to each other by 90°, from the same position of the output end face (the end face close to the output fiber 113) along the optical axis of the output fiber 113. Accordingly, it is possible to obtain a modulated light beam of 100 Gb/s in which the polarization beams of the modulated light of 50 Gb/s are combined.

The polarization beam combining element 110 can be formed of, for example, rutile or calcite. Particularly, a Savart plate formed by bonding two plates (polarization separating plates 110A and 110B) of rutile or the like with the same thickness to each other such that the optical axes thereof are perpendicular to each other can be suitably used. Since the optical path lengths of the light beam from the arm 108 and the light beam from the arm 109 become equal by using the Savart plate, the polarizations of two light beams can be combined to have an optical path difference of zero. The optical path difference caused between two polarization beams may be compensated by using a polarization beam combining element other than the Savart plate.

The one-hole ferrule collimator 112 has a configuration in which a fiber collimator formed of a single-mode fiber is built in a hole portion of the one-hole ferrule, and is opposed to the two-hole ferrule collimator 111.

Figure 2:
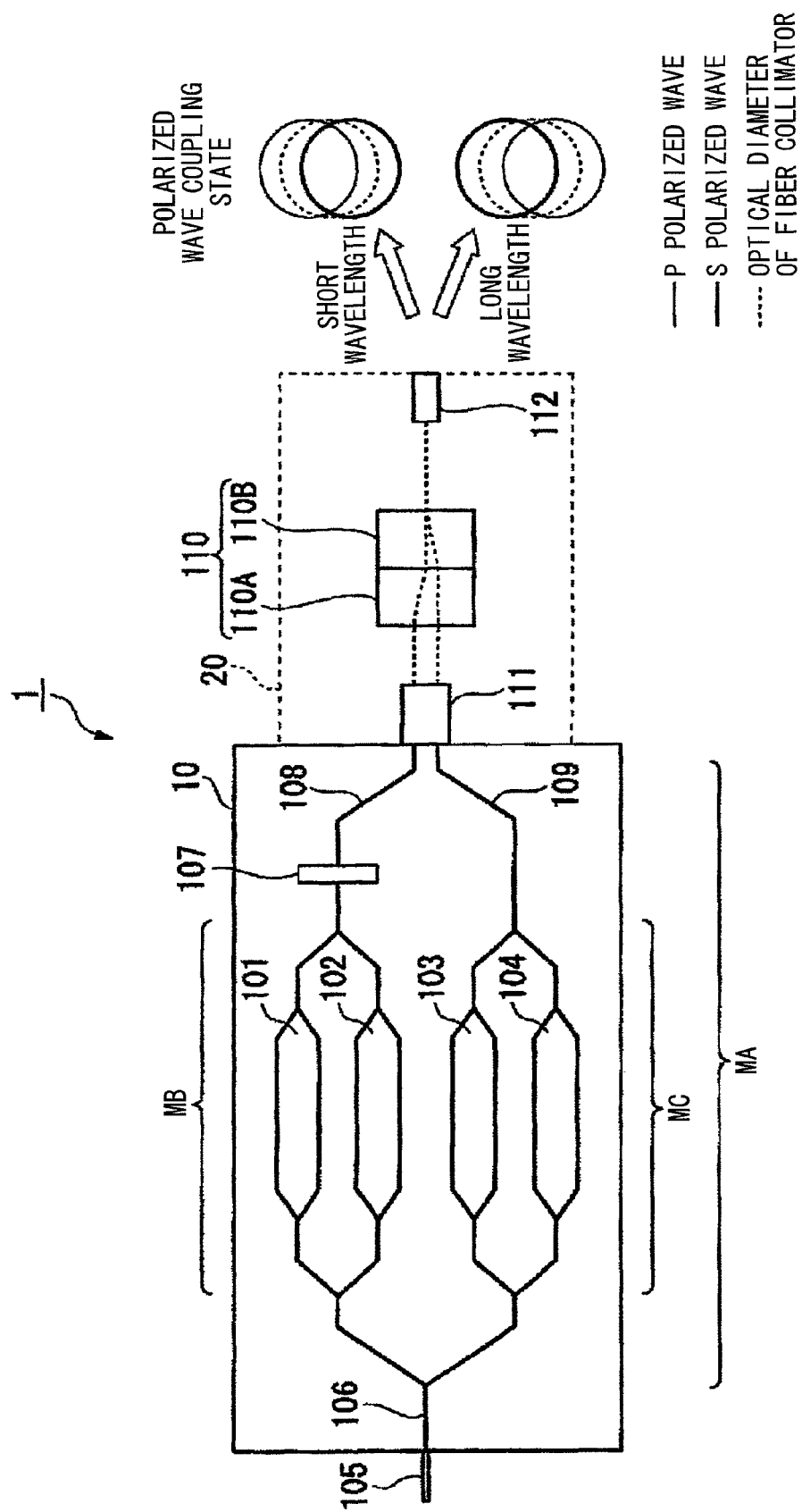
FIG. 2 is a diagram illustrating wavelength and polarization dependences of an output position of two light beams of which polarizations are combined.
Figure 6:
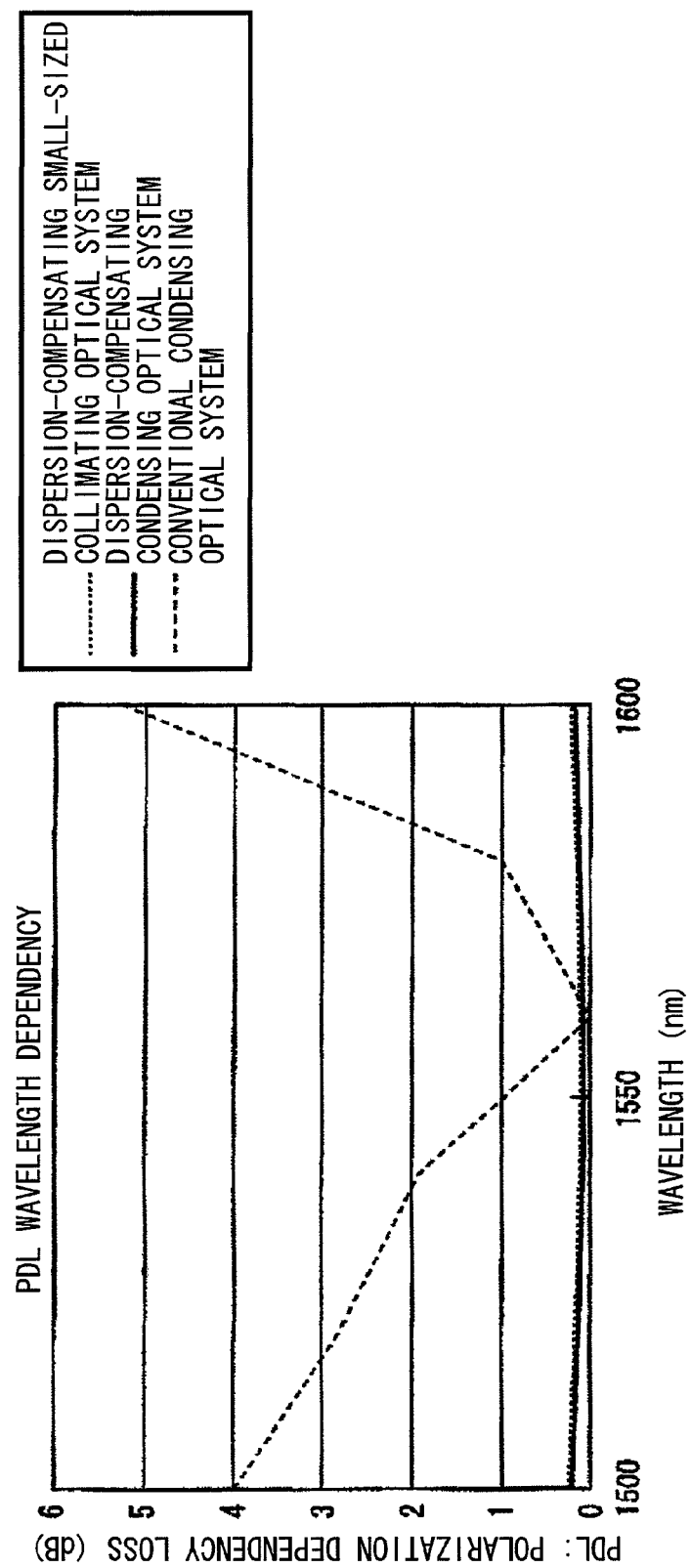
FIG. 6 is a diagram illustrating polarization dependency loss of the optical modulator according to the first embodiment of the present invention.

Here, the positions after the polarization beam combination of the modulated light beam output from the output waveguide 108 of the modulator body 10 and the modulated light beam output from the output waveguide 109, that is, the output positions from the polarization beam combining element 110, vary depending on the wavelength due to the chromatic dispersion of the polarization beam combining element 110. This state is shown in FIG. 2. As can be seen from the drawing, the positional relation between the output centers of the modulated light beam from the output waveguide 108 and the modulated light beam from the output waveguide 109 (one is a P polarization beam and the other is an S polarization beam in the drawing) is inverted in the cases of a short wavelength and a long wavelength. Accordingly, the position of the one-hole ferrule collimator 112 is set such that the fiber collimator is located substantially at the center of the P polarization beam and the S polarization beam. Therefore, even when the wavelength varies and the coupling position of the polarization beams varies accordingly, the variations of the output positions of both polarization beams are substantially the same, whereby it is possible to reduce the polarization dependency loss (PDL) as shown in FIG. 6.

Figure 5:
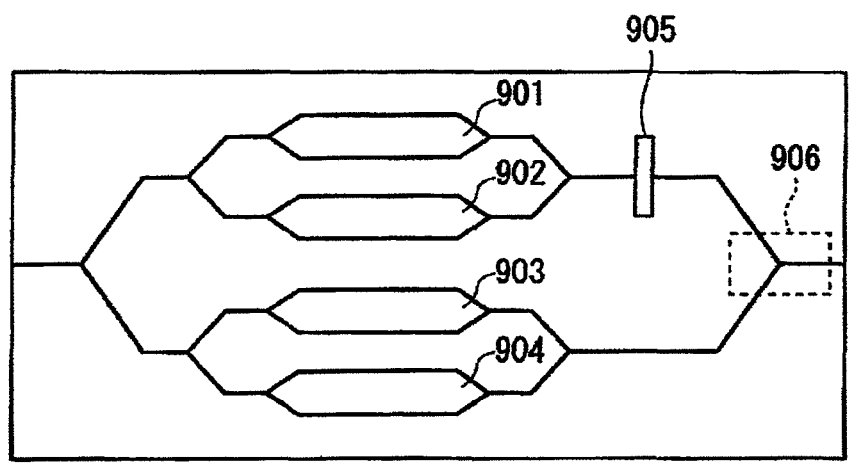
FIG. 5 is a top view illustrating the configuration of a conventional optical modulator.

According to this embodiment, it is possible to obtain a modulated light beam of 100 Gb/s through the use of the polarization beam combination. Since the polarization beam combining unit 20 is constructed by a spatial optical system including three elements of the two-hole ferrule collimator 111, the polarization beam combining element 110, and the one-hole ferrule collimator 112, it is possible to more easily design and fabricate an optical modulator than the conventional optical modulator employing the asymmetric X-shaped waveguide as shown in FIG. 5. Accordingly, it is possible to enhance the fabrication yield and to reduce the size by up to a half or more, thereby reducing the cost. Since the optical modulator includes a collimating optical system, the alignment tolerance is great, thereby guaranteeing high reliability. Since the polarization beam combining element 110 is formed of a Savart plate, the optical path difference between the light beams with different polarization planes output from the arms 108 and 109 is zero, thereby suppressing the polarization dispersion at the time of combining the polarization beams. Since the opposed optical system of the fiber collimators including the two-hole ferrule collimator 111 and the one-hole ferrule collimator 112 is employed without using an expensive chromatic dispersion compensating element and the position of the one-hole ferrule collimator 112 is set substantially to the center of the outputs of both polarization beams, it is possible to compensate for the chromatic dispersion.

A V-grooved block may be used instead of the ferrule. The V-grooved block is widely used for butt-jointing a quartz waveguide element and a fiber and the alignment can be easily automated by the use of commercially-available automatic alignment equipment.

Second Embodiment

Figure 3:
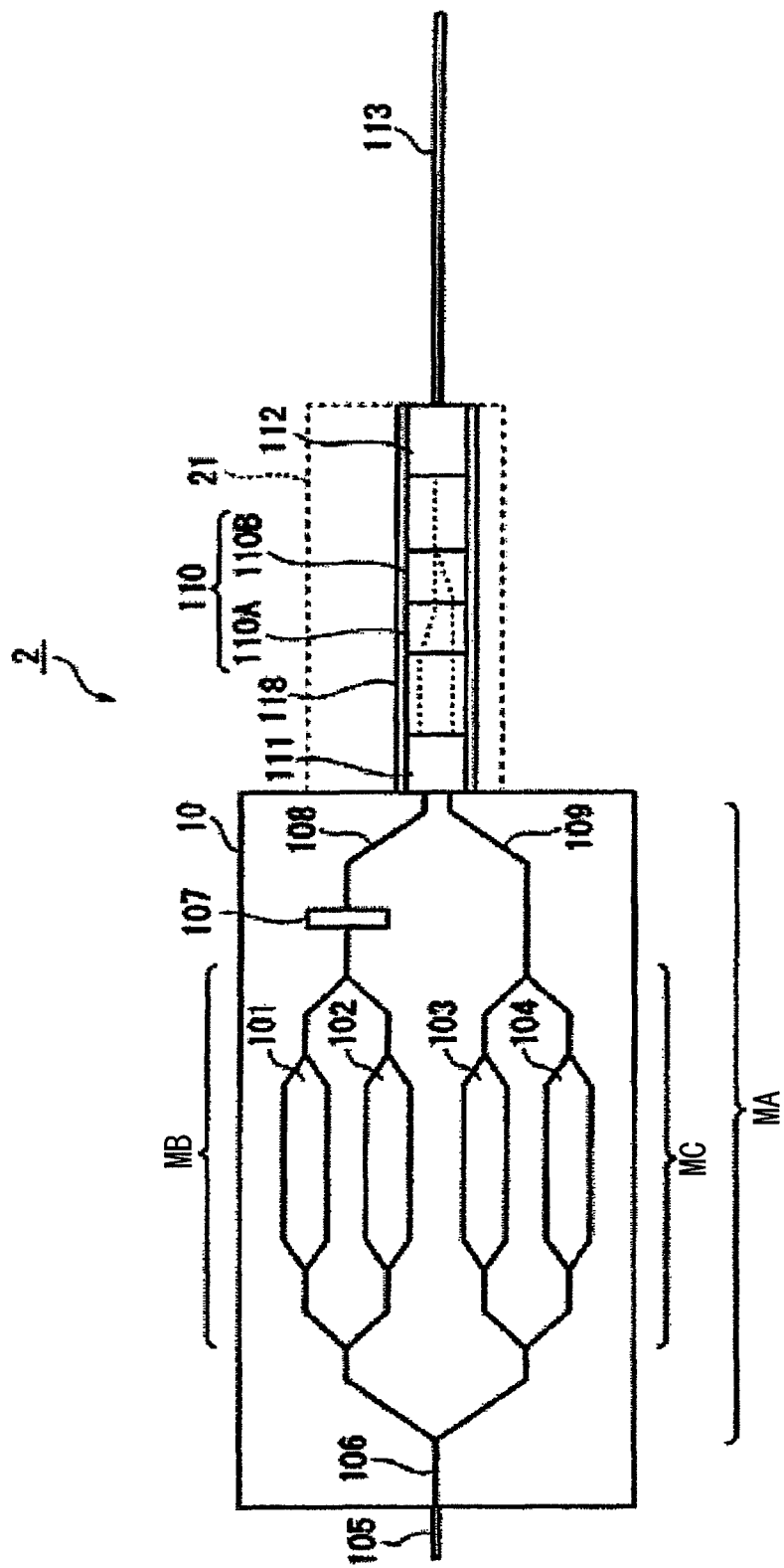
FIG. 3 is a top view illustrating the configuration of an optical modulator according to a second embodiment of the present invention.

FIG. 3 is a top view illustrating the configuration of an optical modulator 2 according to a second embodiment of the present invention. Similarly to the first embodiment, the optical modulator 2 includes a modulator body 10 in which waveguides and modulation electrodes are formed on an LN substrate and a polarization beam combining unit 21 including a spatial collimating optical system that combines polarization beams of output light from the modulator body 10. The modulation electrodes are not shown in FIG. 3.

The optical modulator 2 according to this embodiment is different from the optical modulator 1 according to the first embodiment, in that a 1×2 polarization beam combining module is configured to receive optical components including a polarization beam combining element 21 in a casing 118. The optical modulator 2 will be described below centering on the difference from the optical modulator 1.

In FIG. 3, the 1×2 polarization beam combining module has a configuration in which a two-hole ferrule collimator 111, a polarization beam combining element 110, and a one-hole ferrule collimator 112 are arranged in this order, for example, in a cylindrical metal casing 118. These optical components (the two-hole ferrule collimator 111, the polarization beam combining element 110, and the one-hole ferrule collimator 112) are the same as used in the first embodiment.

The two-hole ferrule collimator 111 is disposed at one end of the 1×2 polarization beam combining module and the interval of two fiber collimators therein is the same as the interval between an arm 108 and an arm 109 on the output end face (the right end face in FIG. 3) of the modulator body (LN substrate) 10.

The optical modulator 2 according to the second embodiment provides the following advantages in addition to the same advantages as the optical modulator 1 according to the first embodiment.

That is, an assembly procedure of bonding the 1×2 polarization beam combining module to the modulator body 10 by producing the 1×2 polarization beam combining module in advance and butt-jointing the two-hole ferrule collimator 111 to the waveguides can be employed. Accordingly, unlike the case where the optical components are respectively aligned and assembled into a casing (not shown) receiving the entire optical modulator 2, the positional misalignment of the optical components due to a stress at the time of welding a cover to the casing can be prevented from occurring, thereby improving the reliability of the characteristics of the optical modulator.

Third Embodiment

Figure 4:
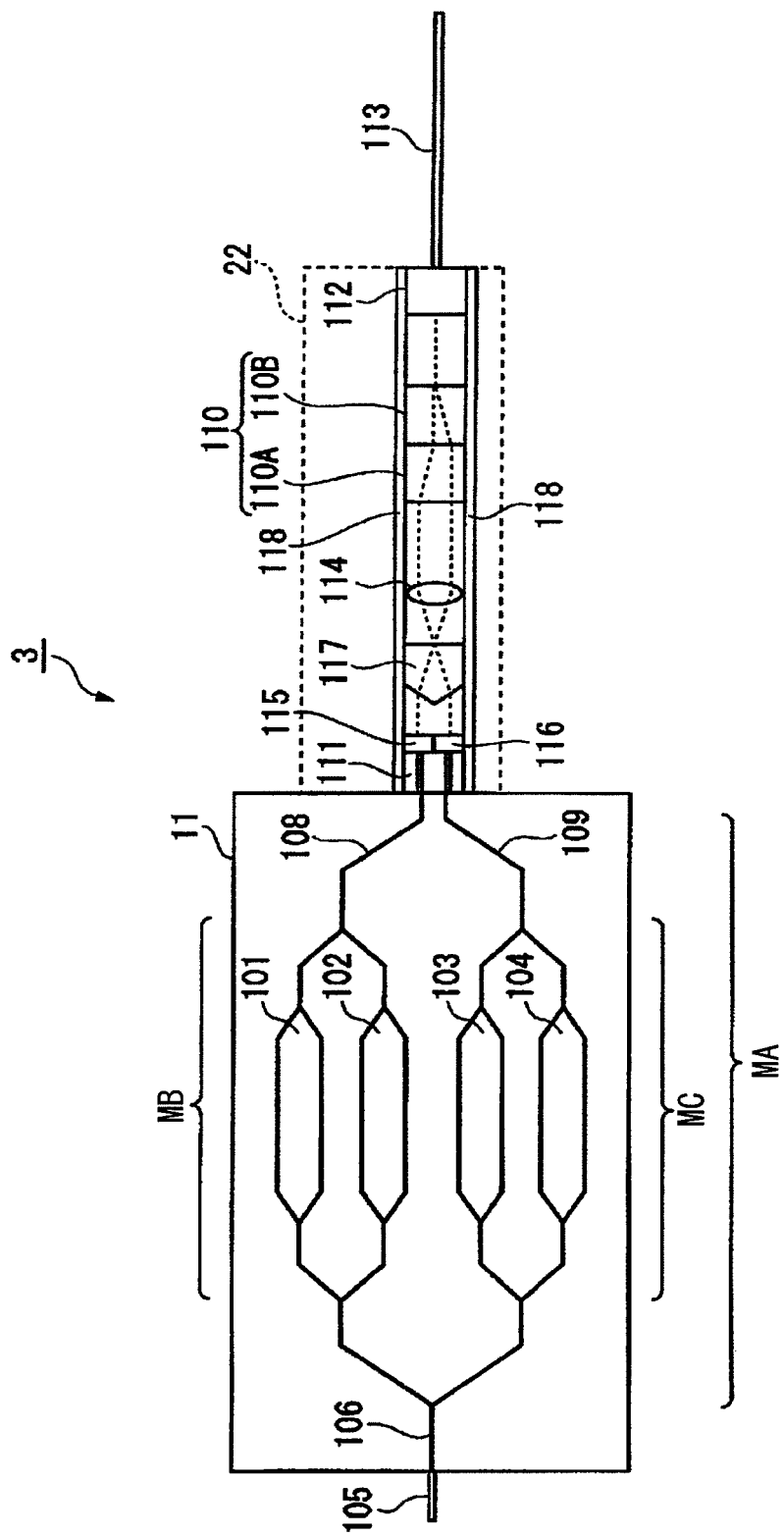
FIG. 4 is a top view illustrating the configuration of an optical modulator according to a third embodiment of the present invention.

FIG. 4 is a top view illustrating the configuration of an optical modulator 3 according to a third embodiment of the present invention. The optical modulator 3 includes a modulator body 11 in which waveguides and modulation electrodes are formed on an LN substrate and a polarization beam combining unit 22 including a spatial condensing optical system that combines polarization beams of output light from the modulator body 11. The modulation electrodes are not shown in FIG. 4.

The optical modulator 3 according to this embodiment is different from the optical modulator 1 according to the first embodiment and the optical modulator 2 according to the second embodiment, in that the polarization beam combining unit 22 is constructed by a spatial condensing optical system instead of the spatial collimating optical system.

In FIG. 4, a 1×2 polarization beam combining module has a configuration in which a two-hole ferrule collimator 111, wave plates 115 and 116, a prism 117, a lens 114, a polarization beam combining element 110, and a one-hole ferrule collimator 112 are arranged in this order, for example, in a cylindrical metal casing 118. Among these optical components, the two-hole ferrule collimator 111, the polarization beam combining element 110, and the one-hole ferrule collimator 112 are the same as used in the first and second embodiments.

The two-hole ferrule collimator 111 is disposed at one end of the 1×2 polarization beam combining module and the interval of two fiber collimators therein is the same as the interval between an arm 108 and an arm 109 on the output end face (the right end face in FIG. 4) of the modulator body (LN substrate) 11.

The end face inside the module of the two-hole ferrule collimator 111 is provided with the wave plate 115 and the wave plate 116 so as to correspond to the output positions of the fiber portions of the two-hole ferrule collimator 111. The wave plate 115 rotates the polarization plane of a light beam by 45° and the wave plate 116 rotates the polarization plane of a light beam by 45° in the opposite direction to the wave plate 115. Accordingly, the polarization plane of the light beam propagating through the arm 108 of the modulator body 11 is rotated by 45° and the polarization plane of the light beam propagating through the arm 109 is rotated by 45° in the opposite direction, whereby both polarized planes are oblique to each other by 90°. Since the wave plates 115 and 116 correspond to the polarization beam rotating means 107 of the optical modulator 1 shown in FIG. 1, the polarization beam rotating means is not disposed in the arm 108 of the optical modulator 11 in this embodiment. The configuration of the modulator body 11 is the same as the modulator body 10 shown in FIG. 1, except that the polarization beam rotating means is not provided.

In the prism 117, an input face (a face close to the wave plates 115 and 116) includes two slopes sloped about the optical axis of the output fiber 113 and the slope angles of the slopes are set such that the normal vector of the slope close to the arm 108 is directed to the arm 108 and the normal vector of the slope close to the arm 109 is directed to the arm 109 (that is, such that a mountain-shaped angular portion is formed by the two slopes). The output end face (the face close to the output fiber 113) of the prism 117 is perpendicular to the optical axis of the output fiber 113. Accordingly, the prism 117 has a function of refracting the light beam output from the wave plate 115 through the arm 108 and the light beam output from the wave plate 116 through the arm 109 so as to intersect each other after passing through the prism 117.

The lens 114 is disposed on the rear side (the side close to the output fiber 113) of the intersection of the light beams output from the wave plates 115 and 116 and intersected by the prism 117. The position and the focal length of the lens 114 is set such that the light beams passing through the lens 114 are condensed on the core portion of the one-hole ferrule collimator 112 as in the first embodiment.

The optical modulator 3 according to the third embodiment having the above-mentioned configuration can provide the same advantages as the optical modulator 1 according to the first embodiment. That is, it is possible to obtain a modulated light beam of 100 Gb/s by the polarization beam combination in the polarization beam combining unit 22. Since the polarization beam combining unit 22 is constructed by a spatial optical system, it is possible to more easily design and fabricate an optical modulator than the conventional optical modulator employing the asymmetric X-shaped waveguide as shown in FIG. 5. Accordingly, it is possible to enhance the fabrication yield and to accomplish a decrease in size and cost and an increase in reliability. Since the polarization beam combining element 110 is formed of a Savart plate, the optical path difference between the light beams with different polarization planes output from the arms 108 and 109 is zero, thereby suppressing the polarization dispersion at the time of combining the polarization beams.

The optical modulator 3 according to the third embodiment can provide the following advantages in addition to the above-mentioned advantages.

That is, an assembly procedure of bonding the 1×2 polarization beam combining module to the modulator body 11 by producing the 1×2 polarization beam combining module in advance and butt-jointing the two-hole ferrule collimator 111 to the waveguides can be employed. Accordingly, unlike the case where the optical components are respectively aligned and assembled into a casing (not shown) receiving the entire optical modulator 3, the positional misalignment of the optical components due to a stress at the time of welding a cover to the casing can be prevented from occurring, thereby improving the reliability of the characteristics of the optical modulator.

Since the prism 117 and the lens 114 are arranged as shown in FIG. 4, it is possible to accurately combine the polarization beams even with the variation in wavelength and to reduce the wavelength dependence of the coupling loss in the output fiber 113. That is, it is assumed that the prism 117 and the lens 114 have such a dispersion characteristic that the refractive index becomes higher as the wavelength becomes shorter and the refractive index becomes lower as the wavelength becomes longer. Then, when the wavelength is shortened, the refraction angle of the prism 117 increases, the angle formed by the propagating direction of the light beam input to the lens 114 and the optical axis of the lens 114 thus increases, and the input position becomes closer to the outer periphery of the lens 114. At this time, since the light beam input to a position close to the outer periphery of the lens 114 can be more strongly refracted due to the large magnitude of the refraction angle in the lens 114, the propagating direction of the light beam output from the lens 114 becomes close to the optical axis of the lens 114.

As a result, the output positions of two polarization beams on the output end face of the polarization beam combining element 110 are not changed in the matched state and the condensed position on the input end face of the one-hole ferrule collimator 112 is also not changed. The same is true when the wavelength becomes longer.

Accordingly, since the output positions from the polarization beam combining element 110 are not changed even when there is a variation in the wavelength, it is possible to accurately combine two different polarization beams in the same optical path. Since the condensing position of the one-hole ferrule collimator 112 is not changed, it is possible to reduce the wavelength dependence of the coupling loss.

The optical modulator 3 according to the third embodiment employs a condensing optical system and thus the size thereof can be greatly reduced.

While the embodiments of the present invention have been described with reference to the accompanying drawings, the specific configuration thereof is not limited to those mentioned above, but may be modified in various designs without departing from the concept of the present invention.

For example, in the polarization beam combining unit 22 shown in FIG. 4, the polarization beam combining element 110 and the lens 114 may be exchanged in position.

The present invention is not limited to the configuration employing the LN optical modulators 101 to 104, but the present invention may be applied to a configuration employing another optical function device instead of the LN optical modulators 101 to 104 as long as it can combine two different polarization beams.

INDUSTRIAL APPLICABILITY

According to the present invention, it is possible to effectively enhance the fabrication yield in an optical modulator including polarization beam combining means and thus the present invention is industrially very useful.

REFERENCE SIGNS LIST 1, 2, 3: OPTICAL MODULATOR
10, 11: MODULATOR BODY
20, 21, 22: POLARIZED WAVE COMBINING UNIT
101 to 104: LN OPTICAL MODULATOR
105: INPUT FIBER
106: INPUT WAVEGUIDE
107: POLARIZED WAVE ROTATING MEANS
108, 109: ARM
110: POLARIZED WAVE COMBINING ELEMENT
110A, 110B: POLARIZATION SEPARATING PLATE
111: TWO-HOLE FERRULE
112: ONE-HOLE FERRULE
113: OUTPUT FIBER
114: LENS
115, 116: WAVE PLATE
117: PRISM
118: CASING
MA, MB, MC: MACH-ZEHNDER WAVEGUIDE

The invention claimed is:

1. An optical modulator comprising:
first and second optical modulation units that are formed on a substrate;
a polarization beam rotating unit that rotates at least one polarization beam of modulated light beams modulated by the first and second optical modulation units; and
a polarization beam combining unit that is disposed outside the substrate and that includes a polarization beam combining element combining the polarization beams of the modulated light of which the polarization beams are rotated by the polarization beam rotating unit,
wherein the polarization beam combining unit includes an optical system in which two opposed collimating systems are arranged,
wherein the two opposed collimating systems include a first collimator to which the modulated light beams modulated by the first and second optical modulation units are input, and a second collimator to which an output light beam of the polarization beam combining element is input,
wherein an input position of the second collimator is substantially located at the center of a position gap varying depending on the polarization beams of the output light of the polarization beam combining element,
wherein at least one of the two opposed collimating systems include fiber collimators, respectively, and
wherein at least one of the two opposed collimating systems is configured to include a ferrule.

2. The optical modulator according to claim 1, wherein the first collimator is a fiber collimator including a two-hole ferrule and the second collimator is a fiber collimator including a one-hole ferrule.

3. The optical modulator according to claim 1, wherein the polarization beam combining element is a Savart plate.

4. The optical modulator according to claim 3, wherein the Savart plate is configured to compensate for an optical path difference between two polarization beams to be combined.

5. The optical modulator according to claim 1, wherein the polarization beam combining unit includes a condensing unit that condenses the modulated light beams on an output fiber.

6. The optical modulator according to claim 1 wherein the polarization beam combining unit includes an optical element having an inverse dispersion characteristic.

7. The optical modulator according to claim 1, wherein the polarization beam rotating unit is half-wave plate.

8. The optical modulator according to claim 1, wherein the polarization beam combining unit comprises a prism and lens which have a dispersion characteristic that the refractive index becomes higher as the wavelength becomes shorter and the refractive index becomes lower as the wavelength becomes longer.

9. The optical modulator according to claim 1, wherein a modulation method of the first and second optical modulation units is phase shift keying.

10. The optical modulator according to claim 1, wherein the first collimator includes a two-hole used in a portion to which the modulated light beams modulated by the first and second optical modulation units are input, and the second collimator includes a one-hole used in a portion to which the output light beam of the polarization beam combining element is input.

11. An optical modulator comprising:
first and second optical modulation units that are formed on a substrate;
a polarization beam rotating unit that rotates at least one polarization beam of modulated light beams modulated by the first and second optical modulation units; and
a polarization beam combining unit that is disposed outside the substrate and that includes a polarization beam combining element combining the polarization beams of the modulated light of which the polarization beams are rotated by the polarization beam rotating unit,
wherein the polarization beam combining unit includes an optical system in which two opposed collimating systems are arranged,
wherein the two opposed collimating systems include a first collimator to which the modulated light beams modulated by the first and second optical modulation units are input, and a second collimator to which an output light beam of the polarization beam combining element is input, wherein an input position of the second collimator is substantially located at the center of a position gap varying depending on the polarization beams of the output light of the polarization beam combining element, and wherein the first collimator includes a V-grooved block including a two-hole, and the second collimator includes a V-grooved block including a one-hole.

12. An optical modulator comprising:

first and second optical modulation units that are formed on a substrate;

a polarization beam rotating unit that rotates at least one polarization beam of modulated light beams modulated by the first and second optical modulation units; and a polarization beam combining unit that is disposed outside the substrate and that includes a polarization beam combining element combining the polarization beams of the modulated light of which the polarization beams are rotated by the polarization beam rotating unit, wherein the polarization beam combining unit includes an optical system in which two opposed collimating systems are arranged, wherein the two opposed collimating systems include a first collimator to which the modulated light beams modulated by the first and second optical modulation units are input, and a second collimator to which an output light beam of the polarization beam combining element is input, wherein an input position of the second collimator is substantially located at the center of a position gap varying depending on the polarization beams of the output light of the polarization beam combining element, wherein at least one of the two opposed collimating systems include fiber collimators, respectively, and wherein at least one of the two opposed collimating systems is configured to include a V-grooved block.

13. An optical modulator comprising:

first and second optical modulation units that are formed on a substrate;

a polarization beam rotating unit that rotates at least one polarization beam of modulated light beams modulated by the first and second optical modulation units; and a polarization beam combining unit that is disposed outside the substrate and that includes a polarization beam combining element combining the polarization beams of the modulated light of which the polarization beams are rotated by the polarization beam rotating unit, wherein the polarization beam combining unit includes an optical system in which two opposed collimating systems are arranged, wherein the two opposed collimating systems include a first collimator and a second collimator, the first collimator includes a two-hole used in a portion to which the modulated light beams modulated by the first and second optical modulation units are input, and the second collimator includes a one-hole used in a portion to which an output light beam of the polarization beam combining element is input, wherein at least one of the two opposed collimating systems includes a fiber collimator, and wherein the second collimator is located between outputs of both the polarization beams of the modulated light beams modulated by the first and second optical modulation units, the second collimator has such an input position as to reduce a polarization dependency loss.

* * * * *